US012678790B2

(12) United States Patent
Billa et al.

(10) Patent No.: US 12,678,790 B2
(45) Date of Patent: Jul. 14, 2026

(54) SENSOR HAVING AN ACTIVE SURFACE

(71) Applicant: Illumina, Inc., San Diego, CA (US)

(72) Inventors: Ravi Billa, Foster City, CA (US);
Arvin Emadi, Hayward, CA (US); Hai Tran, San Diego, CA (US)

(73) Assignee: Illumina, Inc., San Diego, CA (US)

( * ) Notice: Subject to any disclaimer, the term of this patent is extended or adjusted under 35 U.S.C. 154(b) by 926 days.

(21) Appl. No.: 18/051,674

(22) Filed: Nov. 1, 2022

(65) Prior Publication Data

US 2023/0146020 A1    May 11, 2023

Related U.S. Application Data

(60) Provisional application No. 63/263,631, filed on Nov. 5, 2021.

(51) Int. Cl.
B01L 3/00        (2006.01)
G01N 21/64        (2006.01)

(52) U.S. Cl.
CPC . B01L 3/502761 (2013.01); B01L 2200/0652 (2013.01); B01L 2200/16 (2013.01); B01L 2300/0654 (2013.01); G01N 2021/6439 (2013.01)

(58) Field of Classification Search
CPC ....... B01L 3/502761; B01L 2200/0652; B01L 2200/16; B01L 2300/0654; B01L 2300/0636; B01L 2300/0645; B01L 2300/0816; B01L 2300/0887; B01L 3/502715; B01L 3/502707; G01N 2021/6439; G01N 21/6456; G01N 2021/6482; G01N 2021/752; G01N 2021/757; B81B 7/0061; B81B 2201/051
See application file for complete search history.

(56)            References Cited

U.S. PATENT DOCUMENTS

| | | | |
|---|---|---|---|
| 9,670,445 B1 | 6/2017 | Kuo | |
| 2014/0077315 A1 | 3/2014 | Bischopink | |
| 2014/0353789 A1* | 12/2014 | Oganesian | H10F 77/50 |
| | | | 257/434 |
| 2018/0294247 A1 | 10/2018 | Hung | |
| 2020/0373340 A1* | 11/2020 | Emadi | B01L 3/502707 |

FOREIGN PATENT DOCUMENTS

RU          2537094 C1    12/2014

* cited by examiner

*Primary Examiner* — Jennifer Wecker
*Assistant Examiner* — Britney N. Washington
(74) *Attorney, Agent, or Firm* — Heslin Rothenberg Farley & Mesiti P.C.

(57)            ABSTRACT

Examples herein include an apparatus having a substrate, a sensor over the substrate including an active surface and a sensor bond pad, a molding layer over the substrate and covering sides of the sensor, the molding layer having a lower portion with a first molding height relative to a top surface of the substrate and an upper portion with a second molding height relative to the top surface of the substrate, the first molding height and the second molding height each being greater than a height of the active surface, the second molding height being great than the first molding height; and a lidding layer over at least some of the lower portion of the molding layer and over the active surface. The lidding layer and the molding layer form a space over the active surface of the sensor that defines a flow channel.

17 Claims, 5 Drawing Sheets

SENSOR HAVING AN ACTIVE SURFACE

CROSS-REFERENCE TO RELATED APPLICATIONS

This U.S. Patent Application claims priority to U.S. Provisional Patent Application No. 63/263,631, filed Nov. 5, 2021, entitled Sensor Having An Active Surface, the entire contents of which are hereby incorporated herein by reference.

BACKGROUND

Various protocols in biological or chemical research involve performing a large number of controlled reactions on local support surfaces or within predefined reaction chambers. The designated reactions may then be observed or detected, and subsequent analysis may help identify or reveal properties of substances involved in the reaction. For example, in sonic multiplex assays, an unknown analyte having an identifiable label (e.g., fluorescent label) may be exposed to thousands of known probes under controlled conditions. Each known probe may be deposited into a corresponding well of a microplate. Observing any chemical reactions that occur between the known probes and the unknown analyte within the wells may help identify or reveal properties of the analyte. Other examples of such protocols include known DNA sequencing processes, such as sequencing-by-synthesis (SBS) or cyclic-array sequencing.

In some pre-existing fluorescent-detection protocols, an optical system is used to direct an excitation light onto fluorescently-labeled analytes and to also detect the fluorescent signals that may be emitted from the analytes. However, such optical systems can be relatively expensive and involve a relatively large benchtop footprint. For example, such optical systems may include an arrangement of lenses, filters, and light sources. In other pre-existing detection systems, the controlled reactions occur on local support surfaces or within predefined reaction chambers of a flow cell that does not require a large optical assembly to detect the fluorescent emissions. The flow cells of such systems may be designed as a single use consumable item.

In at least some pre-existing detection systems, reagents flow through a flow channel of the flow cell, between a lid and an active surface of a sensor. The volume of reagents used for a particular protocol may depend at least in part in the distance between the lid and the active surface of a sensor, referred to as the gap height.

SUMMARY

Accordingly, it may be beneficial for the flow cell to be a small and inexpensive device. In a relatively small flow cell, it may be beneficial and advantageous to utilize as much of the sensor active area of the light detection device as possible and/or provide as large as a sensor active area as possible. Also, it may be beneficial and advantageous to make the gap height between the lid and the active surface of the sensor as small as possible to reduce the volume of reagents used during particular protocols, such as SBS. The shortcomings of pre-existing approaches may be overcome and additional benefits and advantages are provided through the examples provided herein.

In one aspect, an apparatus is provided, for example a sensor apparatus. The apparatus comprises a substrate having a substrate bond pad; a sensor over the substrate, the sensor comprising an active surface and a sensor bond pad; a molding layer over the substrate and covering sides of the sensor, the molding layer having a lower portion with a first molding height relative to a top surface of the substrate and an upper portion with a second molding height relative to the top surface of the substrate, the first molding height and the second molding height each being greater than a height of the active surface, the second molding height being great than the first molding height; and a lidding layer over at least some of the lower portion of the molding layer and over the active surface; wherein the lidding layer and the molding layer collectively form a space over the active surface of the sensor, the space defining a flow channel.

In some examples, the apparatus further comprises a wire bond connecting the sensor bond pad to the substrate bond pad.

In some examples, the upper portion of the molding layer covers the wire bond.

In some examples, the second molding height of the upper portion is greater than a height of a top surface of the lidding layer relative to the top surface of the substrate.

In some examples, the apparatus further comprises a passivation layer over the active surface of the sensor.

In some examples, the passivation layer comprises reaction recesses.

In some examples, the apparatus further comprises a functionalized coating over the passivation layer.

In some examples, the flow channel encompasses substantially all of the active surface of the sensor.

In some examples, the flow channel encompasses the entire active surface of the sensor and at least a portion of an inactive surface of the sensor.

In some examples, the lower portion is flat.

In some examples, the upper portion is flat.

In some examples, the lidding layer comprises an inlet port and an outlet port.

In some examples, a surface of the molding layer is between the inlet port and the active surface of the sensor within the flow channel.

In some examples, the substrate comprises one or more dielectric layers, each of the one or more dielectric layers comprising one or more conductive pathways therein.

In some examples, the sensor comprises a Complementary Metal-Oxide-Semiconductor (CMOS) detection device.

In some examples, the apparatus is part of a cartridge to perform biological analysis, chemical analysis, or both.

In accordance with another aspect, a method is provided. The method comprises placing a sensor over a substrate, the sensor comprising an active surface and a sensor bond pad, wherein the substrate comprises a substrate bond pad; forming a molding layer over the substrate that covers the sides of the sensor, the molding layer having a lower portion with a first molding height relative to a top surface of the substrate and an upper portion with a second molding height relative to the top surface of the substrate, the first molding height and the second molding height each being greater than a height of the active surface, the second molding height being great than the first molding height; and placing a lidding layer over at least some of the lower portion of the molding layer and over the sensor surface to form a space over the active surface of the sensor, wherein the space defines a flow channel.

In some examples, the method further comprises wire bonding the sensor bond pad to the substrate bond pad.

In some examples, the method further comprises covering the wire bonds with the upper portion of the molding layer.

In some examples, the method further comprises forming an inlet port and an outlet port in the lidding layer.

In some examples, the method further comprises comprising forming a passivation layer on the sensor surface.

In some examples, the method further comprises forming reaction recesses in the passivation layer.

In some examples, the method further comprises comprising forming a functionalized coating on the passivation layer.

In accordance with another aspect, a method of using a flow cell is provided. The method comprises: connecting the flow cell to a device, the flow cell comprising: a substrate having a substrate bond pad; a sensor over the substrate, the sensor comprising an active surface and a sensor bond pad; a molding layer over the substrate and covering sides of the sensor, the molding layer having a lower portion with a first molding height relative to a top surface of the substrate and an upper portion with a second molding height relative to the top surface of the substrate, the first molding height and the second molding height each being greater than a height of the active surface, the second molding height being greater than the first molding height; and a lidding layer over at least some of the lower portion of the molding layer and over the active surface, wherein the lidding layer and the molding layer collectively form a space over the active surface of the sensor, the space defining a flow channel; utilizing the active surface to perform a designated reaction in the flow cell, the utilizing comprising: delivering, via the flow channel, at least one reaction component to the active surface; and transmitting results of the designated reaction to the device.

In accordance with another aspect, a method of using a flow cell is provided. The method comprises: delivering, via a flow channel of the flow cell, at least one reaction component to an active surface of the flow cell, the flow cell comprising: a substrate having a substrate bond pad; a sensor over the substrate, the sensor comprising the active surface and a sensor bond pad; a molding layer over the substrate and covering sides of the sensor, the molding layer having a lower portion with a first molding height relative to a top surface of the substrate and an upper portion with a second molding height relative to the top surface of the substrate, the first molding height and the second molding height each being greater than a height of the active surface, the second molding height being greater than the first molding height; and a lidding layer over at least some of the lower portion of the molding layer and over the active surface, wherein the lidding layer and the molding layer collectively form a space over the active surface of the sensor, the space defining the flow channel; and detecting a designated reaction using the active surface.

It should be appreciated that all combinations of the foregoing aspects and additional concepts discussed in greater detail below (provided such concepts are not mutually inconsistent) are contemplated as being part of the inventive subject matter disclosed herein.

These and other objects, features and advantages of this disclosure will become apparent from the following detailed description of the various aspects of the disclosure taken in conjunction with the accompanying drawings.

BRIEF DESCRIPTION OF THE DRAWINGS

These, and other objects, features and advantages of this disclosure will become apparent from the following detailed description of the various aspects thereof taken in conjunction with the accompanying drawings, in which:

FIGS. 1-5 are cross-sectional views of an example of various stages of fabricating an apparatus according to selected implementations of the current disclosure.

FIG. 1 is a cross-sectional view of one example of dicing a sensor wafer having multiple sensors. The sensors include, for example, an active surface.

FIG. 2 is a cross-sectional view of one example of attaching the sensor dies of FIG. 1 onto a substrate, in accordance with one or more aspects of the present disclosure.

FIG. 3 is a cross-sectional view of one example of forming wire bonds from sensor bond pads to substrate bond pads of FIG. 2, in accordance with one or more aspects of the present disclosure.

DETAILED DESCRIPTION

Figures 1, 2, 3:
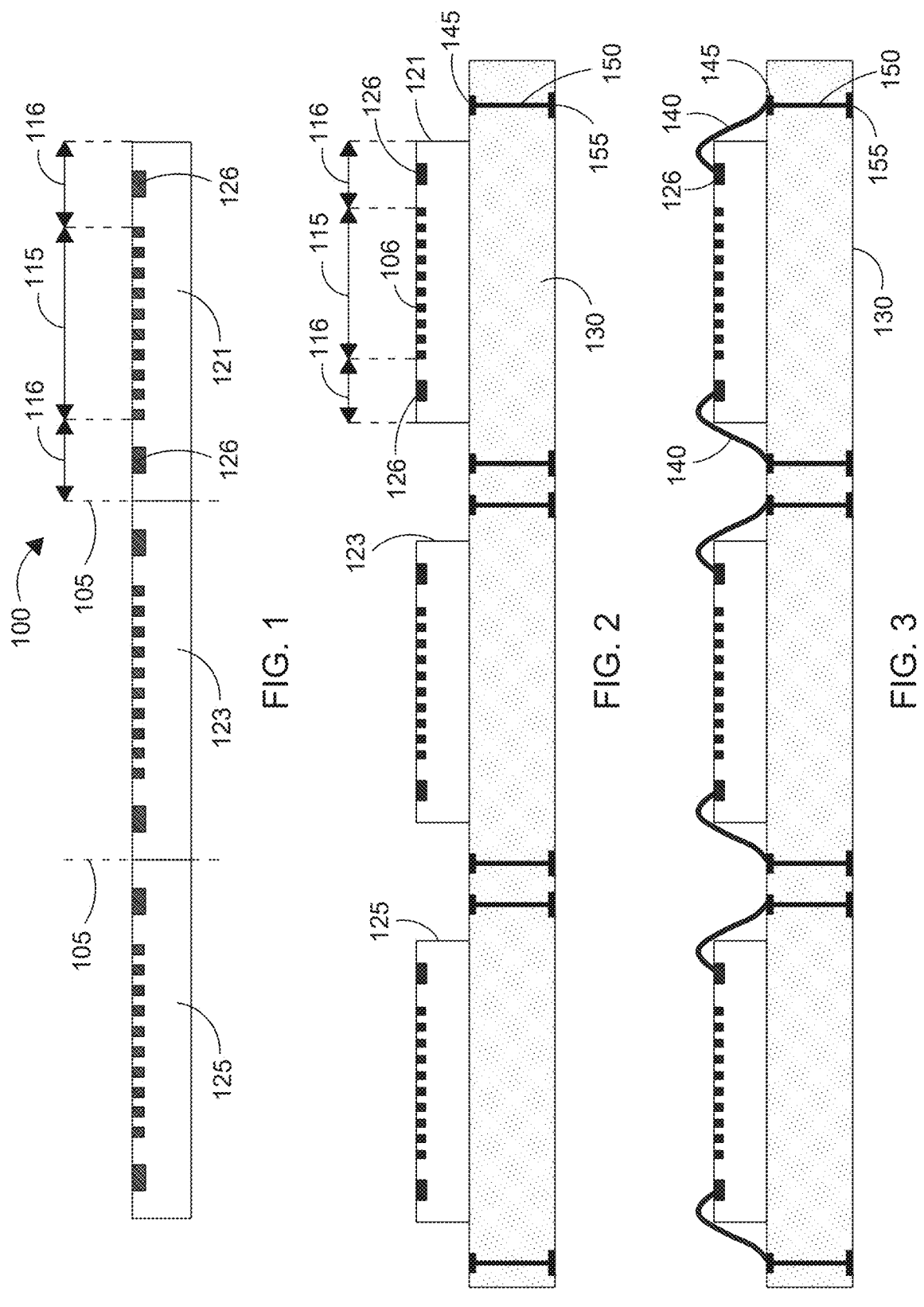

Aspects of the present disclosure and certain features, advantages, and details thereof, are explained more fully below with reference to the non-limiting examples illustrated in the accompanying drawings. Descriptions of well-known materials, fabrication tools, processing techniques, etc., are omitted so as not to unnecessarily obscure the relevant details. It should be understood, however, that the detailed description and the specific examples, while indicating aspects of the disclosure, are given by way of illustration only, and are not by way of limitation. Various substitutions, modifications, additions, and/or arrangements, within the spirit and/or scope of the underlying inventive concepts will be apparent to those skilled in the art from this disclosure.

Approximating language, as used herein throughout the specification and claims, may be applied to modify any quantitative representation that may permissibly vary without resulting in a change in the basic function to which it is related. Accordingly, a value or parameter modified by a term or terms, such as "about" or "substantially," is not limited to the precise value specified. For example, these terms can refer to less than, greater than, or equal to ±5% of the value or parameter, such as less than, greater than, or equal to ±2%, such as less than, greater than or equal to ±1%, such as less than, greater than, or equal to ±0.5%, such as less than, greater than, or equal to ±0.2%, such as less than, greater than, or equal to ±0.1%, such as less than, greater than, or equal to ±0.05%. For example, the term "substantially all" can encompass all of something, 5% less than all, 2% less than all, 1% less than all, 0.5% less than all, or 0.1% less than all. By way of another example, the term)

"substantially equal" can encompass equal to a. value, ±5% of a value, ±2% of a value, ±1% of a value all, ±0.5% of a value, or ±0.1% of a value. In some instances, the approximating language may correspond to the precision of an instrument for measuring the value. In some instances, the approximating language may correspond to the precision of an instrument for measuring the value.

The terminology used herein is for the purpose of describing particular examples only and is not intended to be limiting. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include (and any form of include, such as "includes" and "including"), and "contain" (and any form of contain, such as "contains" and "containing") are open-ended linking verbs. As a result, a method or device that "comprises," "has," "includes" or "contains" one or more steps or elements possesses those one or more steps or elements, but is not limited to possessing only those one or more steps or elements. Likewise, a step of a method or an element of a device that "comprises," "has," "includes" or "contains" one or more features possesses those one or more features, but is not limited to possessing only those one or more features. Furthermore, a device or structure that is configured in a certain way is configured in at least that way, but may also be configured in ways that are not listed.

Further, the terms "connect," "connected," "contact" and/ or the like are broadly defined herein to encompass a variety of divergent arrangements and assembly techniques. These arrangements and techniques include, but are not limited to (1) the direct coupling of one component and another component with no intervening components therebetween (i.e., the components are in direct physical contact) and (2) the coupling of one component and another component with one or more components therebetween, provided that the one component being "connected to" or "contacting" the other component is somehow in operative communication (e.g., electrically, fluidly, physically, optically, etc.) with the other component (notwithstanding the presence of one or more additional components therebetween). It is to be understood that sonic components that are in direct physical contact with one another may or may not be in electrical contact and/or fluid contact with one another. Moreover, two components that are electrically connected or fluidly connected may or may not be in direct physical contact, and one or more other components may be positioned therebetween.

As used herein, a "flow cell" can include a device having a lid extending over a reaction structure to form a flow channel therebetween that is in communication with a plurality of reaction sites of the reaction structure, and can include a detection device that is configured to detect designated reactions that occur at or proximate to the reaction sites. A flow cell may include a solid-state light detection or "imaging" device, such as a Charge-Coupled Device (CCD) or Complementary Metal-Oxide Semiconductor (CMOS) (light) detection device. As one specific example, a flow cell may be configured to fluidically and electrically couple to a cartridge (having an integrated pump), which may be configured to fluidically and/or electrically couple to a bioassay system. A cartridge and/or bioassay system may deliver a reaction solution to reaction sites of a flow cell according to a predetermined protocol (e.g., sequencing-by-synthesis), and perform a plurality of imaging events. For example, a cartridge and/or bioassay system may direct one or more reaction solutions through the flow channel of the flow cell, and thereby along the reaction sites. At least one of the reaction solutions may include four types of nucleotides having the same or different fluorescent labels. The nucleotides may bind to the reaction sites of the flow cell, such as to corresponding oligonucleotides at the reaction sites. The cartridge and/or bioassay system may then illuminate the reaction sites using an excitation light source (e.g., solid-state light sources, such as light-emitting diodes (LEDs)). The excitation light may have a predetermined wavelength or wavelengths, including a range of wavelengths. The fluorescent labels excited by the incident excitation light may provide emission signals (e.g., light of a wavelength or wavelengths that differ from the excitation light and, potentially, each other) that may be detected by the light sensors of the flow cell.

Flow cells described herein may be configured to perform various biological or chemical processes. More specifically, the flow cells described herein may be used in various processes and systems where it is desired to detect an event, property, quality, or characteristic that is indicative of a designated reaction. For example, flow cells described herein may include or be integrated with light detection devices, biosensors, and their components, as well as bioassay systems that operate with biosensors.

The flow cells may be configured to facilitate a plurality of designated reactions that may be detected individually or collectively. The flow cells may be configured to perform numerous cycles in which the plurality of designated reactions occurs in parallel. For example, the flow cells may be used to sequence a dense array of DNA features through iterative cycles of enzymatic manipulation and light or image detection/acquisition. As such, the flow cells may be in fluidic communication with one or more microfluidic channels that deliver reagents or other reaction components in a reaction solution to a reaction site of the flow cells. The reaction sites may be provided or spaced apart in a predetermined manner, such as in a uniform or repeating pattern. Alternatively, the reaction sites may be randomly distributed. Each of the reaction sites may be associated with one or more light guides and one or more light sensors that detect light from the associated reaction site. In one example, light guides include one or more filters for filtering certain wavelengths of light. The light guides may be, for example, an absorption filter (e.g., an organic absorption filter) such that the filter material absorbs a certain wavelength (or range of wavelengths) and allows at least one predetermined wavelength (or range of wavelengths) to pass therethrough. In some flow cells, the reaction sites may be located in reaction recesses or chambers, which may at least partially compartmentalize the designated reactions therein.

As used herein, a "designated reaction" includes a change in at least one of a chemical, electrical, physical, or optical property (or quality) of a chemical or biological substance of interest, such as an analyte-of-interest. In particular flow cells, a designated reaction is a positive binding event, such as incorporation of a fluorescently labeled biomolecule with an analyte-of-interest, for example. More generally, a designated reaction may be a chemical transformation, chemical change, or chemical interaction. A designated reaction may also be a change in electrical properties. In particular flow cells, a designated reaction includes the incorporation of a fluorescently-labeled molecule with an analyte. The analyte may be an oligonucleotide and the fluorescently-labeled molecule may be a nucleotide. A designated reaction may be detected when an excitation light is directed toward the oligonucleotide having the labeled nucleotide, and the fluorophore emits a detectable fluorescent signal. In another example of flow cells, the detected fluorescence is a result of chemiluminescence or bioluminescence. A designated reaction may also increase fluorescence (or Förster) resonance energy transfer (FRET), for example, by bringing a donor fluorophore in proximity to an acceptor fluorophore, decrease FRET by separating donor and acceptor fluorophores, increase fluorescence by separating a quencher from a fluorophore, or decrease fluorescence by co-locating a quencher and fluorophore.

As used herein, "electrically coupled" refers to a transfer of electrical energy between any combination of a power source, an electrode, a conductive portion of a substrate, a droplet, a conductive trace, wire, other circuit segment and the like. The term electrically coupled may be utilized in connection with direct or indirect connections and may pass through various intermediaries, such as a fluid intermediary, an air gap and the like.

As used herein, a "reaction solution," "reaction component" or "reactant" includes any substance that may be used to obtain at least one designated reaction. For example, potential reaction components include reagents, enzymes, samples, other biomolecules, and buffer solutions, for example. The reaction components may be delivered to a reaction site in the flow cells disclosed herein in a solution and/or immobilized at a reaction site. The reaction components may interact directly or indirectly with another substance, such as an analyte-of-interest immobilized at a reaction site of the flow cell.

As used herein, the term "reaction site" is a localized region where at least one designated reaction may occur. A reaction site may include support surfaces of a reaction structure or substrate where a substance may be immobilized thereon, For example, a reaction site may include a surface of a reaction structure (which may be positioned in a channel of a flow cell) that has a. reaction component thereon, such as a. colony of nucleic acids thereon. In some flow cells, the nucleic acids in the colony have the same sequence, being for example, clonal copies of a single stranded or double stranded template. However, in some flow cells a reaction site may contain only a single nucleic acid molecule, for example, in a single stranded or double stranded form.

Reference is made below to the drawings, which are not drawn to scale for ease of understanding, wherein the same reference numbers are used throughout different figures to designate the same or similar components.

FIG. 1 is a cross-sectional view of one example of a sensor wafer 100 including a plurality of sensors therein, in accordance with one or more aspects of the present disclosure. The sensors include, for example, an active surface 115, inactive surface 116, and sensor bond pads 126. Dashed lines 105 indicate the dicing of the sensor wafer 100 into separate sensors 121, 123, and 125.

In one example, a sensor surface may be comprised of an active surface and an inactive surface. As used herein, the term "sensor surface" refers to the active surface and the inactive surface. As used herein, the term "active surface" refers to a surface or surface portion of a sensor where sensing actively takes place. The terms "active surface" and "active sensor surface" may be used interchangeably herein. For example, the active surface of a digital image sensor is the surface including the photosites or pixels for sensing light. Non-limiting examples of the function(s) of the sensor include, for example, light sensing (e.g., having a predetermined range of wavelengths sensed), detecting the presence of one or more substances (e.g., biological or chemical substance) and detecting a change in concentration of a substance (e.g., ion concentration), Biological or chemical substance includes biomolecules, samples-of-interest, analytes-of-interest, and other chemical compound that may be used to detect, identify, or analyze other chemical compounds, or function as intermediaries to study or analyze other chemical compounds. In one example, the active surface is a continuous region, while in another example, the active surface may comprise discrete regions on the sensor surface. As used herein, the term "inactive surface" refers to a surface or surface portion of a sensor that is not configured to perform sensing. In one example, the inactive surface is a continuous region that surrounds the active surface and extends along the perimeter of the sensor surface. In another example, the inactive surface may comprise discrete regions on the sensor surface that are adjacent to one or more active surfaces. The inactive surface may include, for example, the sensor bond pads 126 as shown in FIG. 1.

As used herein, a "sensor" may include, for example, one or more semiconductor materials, and may take the form of, for example, a Complementary Metal-Oxide Semiconductor (CMOS) detection device (e.g., a CMOS imager) or a Charge-Coupled Device (CCD), another type of image detection device. The circuitry of a CMOS detection device may include passive electronic elements, such as a clock and timing generation circuit, an analog-to-digital converter, etc., as well as an array of photodetectors to convert photons (light) to electrons that are then converted to a voltage. The sensor may be fabricated on a silicon substrate (e.g., a silicon wafer), from which it is subsequently cut from. The thickness of the sensor may depend on the size of the silicon wafer that it is fabricated on. "Size" may refer to the diameter in one example where the silicon wafer is circular. For example, a standard silicon wafer with a 51 mm diameter may have a thickness of about 275 micrometers (µm), while a standard silicon wafer with a diameter of 300 mm may have a thickness of about 775 microns. Further, wafers may be thinned down to a desired thickness by techniques such as grinding or chemical-mechanical polishing (CMP). As used herein, the active area of the sensor(s) refers to the sensor surface that will come into contact with the reaction components for sensing. Although the present example includes planar sensor devices, it will be understood that non-planar devices may instead be used, or a combination thereof. A sensor may comprise additional components. For example, a sensor may also include light filters, reaction chambers, passivation layers, and functionalized coatings, etc., as described herein.

As used herein, "CMOS detection device" and "CMOS imager" refer to sensors fabricated using CMOS technology or sensors comprising a CMOS element. One example of the fabrication of a semiconductor device fabricated using CMOS technology will now be provided. Starting, for example, with a p-type semiconductor substrate, the NMOS (negative channel metal oxide semiconductor) region may be protected while an n-type well is created in the PMOS (positive channel metal oxide semiconductor) region. This may be accomplished using, for example, one or more lithographic processes. A thin gate oxide and gate (e.g., polysilicon) may then be formed in both the NMOS and PMOS regions. N+ type dopant regions may be formed in the p-type substrate of the NMOS region on either side of the dummy gate (i.e., the source and drain are formed), and one region of then±type dopant as the body (here, the well) contact in the PMOS region. This may be accomplished using, for example, a mask. The same process of masking and doping may then be used to form the source and drain in the PMOS region and the body contact in the NMOS region. Metallization to form the terminals to the various regions of the NMOS and PMOS transistors (i.e., body, source, drain and gate) may then be performed.

The "complementary" aspect of the name refers to the inclusion of both n-type and p-type metal-oxide semiconductor field effect transistors (MOSFETs) in integrated circuits (ICs) fabricated using CMOS technology. Each MOSFET has a metal gate with a gate dielectric, such as an oxide (hence, the "Metal-Oxide" part of the name) and a semiconductor material below the gate (corresponds to "Semiconductor" in the name). ICs are fabricated on a portion of a semiconductor substrate or wafer that is cut out after fabrication, and ICs fabricated using CMOS technology are characterized by, for example, high noise immunity and low static power consumption (one of the transistors is always off).

In one example, a CMOS detection device may include, for example, millions of photodetectors, also called pixels. Each pixel includes a photosensor, which accumulates charge from the light, an amplifier to convert the accumulated charge into a voltage, and a pixel-select switch. Each pixel may also include, for example, an individual microlens to capture more of the light, or have other enhancements to improve the image such as, for example, noise reduction. In one example, a CMOS detection device is about 9200 μm long, about 8000 μm wide, and about 600-1000 μm thick. In one example, the CMOS detection device is 680 μm thick. The CMOS detection device can comprise a pixel array. In one example, the pixel array is 4384×3292 pixels, with overall dimensions of 7272 μm×5761 μm.

In one example, the sensor comprises a biosensor that includes a reaction structure with a plurality of reaction sites configured to detect designated reactions that occur at or proximate to the reaction sites. A sensor may include a solid-state light detection or imaging device (e.g., CCD or CMOS light detection device) and, optionally, a flow cell mounted thereto. The flow cell may include at least one flow channel that is in fluid communication with the reaction sites to direct a reaction solution thereto. The plurality of reaction sites may be randomly distributed along the reaction structure or arranged in a predetermined manner (e.g., side-by-side in a matrix, such as in microarrays). A reaction site can also include a reaction chamber or recess that at least partially defines a spatial region or volume configured to compartmentalize the designated reaction. A reaction recess may be at least partially separated from the surrounding environment or other spatial regions. For example, the reaction recesses may be nanowells comprising an indent, pit, well, groove, cavity or depression defined by interior surfaces of a detection surface and have an opening or aperture (i.e., be open-sided) so that the nanowells can be in fluid communication with a flow channel.

As one specific example, the sensor is configured to fluidically and electrically couple to a bioassay system. The bioassay system may deliver a reaction solution to the reaction sites according to a predetermined protocol (e.g., sequencing-by-synthesis) and perform a plurality of imaging events. For example, the bioassay system may direct reaction solutions to flow along the reaction sites. At least one of the reaction solutions may include four types of nucleotides having the same or different fluorescent labels. The nucleotides may bind to the reaction sites, such as to corresponding oligonucleotides at the reaction sites. The bioassay system may then illuminate the reaction sites using an excitation light source (e.g., solid-state light sources, such as light-emitting diodes (LEDs)). The excitation light may have a predetermined wavelength or wavelengths, including a.

range of wavelengths. The fluorescent labels excited by the incident excitation light may provide emission signals (e.g., light of a wavelength or wavelengths that differ from the excitation light and, potentially, each other) that may be detected by the light sensors.

FIG. 2 is a cross-sectional view of one example of preparation for and placement of the sensors from sensor wafer 100 FIG. 1 onto a substrate 130, in accordance with one or more aspects of the present disclosure, e.g. sensors 121, 123 and 125. For the following discussion, reference will be made to sensor 121. By way of example, substrate 130 may be in wafer form or panel form. In one example, the substrate 130 may comprise, or take the form of, a dielectric layer, or a multi-layered dielectric, with one or more conductive pathways therethrough. In another example, the substrate may instead take the form of a dielectric layer without conductive pathways Non-limiting examples of dielectric materials that may be used in the dielectric layer include low-k dielectric materials (dielectric constant less than that of silicon dioxide, about 3.9), such as glass-reinforced epoxy laminates, polyamides, fluorine-doped silicon dioxide, carbon-doped silicon dioxide and porous silicon dioxide, and high-k dielectric materials (dielectric constant above about 3.9), such as silicon nitride (SiNx) and hafnium dioxide. Sensor 121 may be attached to the substrate 130 using, for example, a die-attach adhesive paste or film that may provide, for example, low or ultra-low stress on the sensor and high temperature stability. Examples of die-attach pastes include Supreme 3HTND-2DA and EP3HTSDA-1 by MasterBond (USA), and LOCTITE ABLESTIK ATB-F100E by Henkel Corp. USA. An example of a die attach adhesive film is LOCTITE ABLESTIK CDF100 by Henkel Corp, (USA). In one example, the sensor may be directly attached to the substrate, while in other examples a structure, coating or layer may be interposed between the substrate and the sensor. Sensor 121 includes active surface 115, inactive surface 116, and sensor bond pads 126. In one example, the conductive pathways through substrate 130 include topside substrate bond pads 145, electrical vias 150, and bottom side substrate bond pads 155. In one example, topside substrate bond pads 145 are part of a land grid array (LGA) which may comprise a printed circuit board (PCB) or ceramic material. Thus, the sensor 121 is electrically connected to the bottom side substrate bond pads. In one example, the surface of the sensor includes one or more reaction recesses 106. In one example, the reaction recesses 106 are nanowells. In one example, the substrate 130 may contain numerous metal layers.

In one example, a passivation layer is provided on the sensor surface to protect the sensor from harmful reaction components and serve as a support surface or substrate for wafer level chemistries. The passivation layer may comprise a single layer or multiple layers. In the example of multiple layers, the different layers may comprise the same or different materials. In one example, the passivation layer comprises an oxide, such as silicon dioxide, or silicon oxy-nitride. In another example, the passivation layer comprises a metal oxide, such as tantalum pentoxide ($Ta_2O_5$). In another example, the passivation layer may comprise a low-temperature film such a silicon nitride ($Si_xN_y$). For example, the passivation layer may include multiple layers in which at least one of the sub-layers includes tantalum pentoxide ($Ta_2O_5$) and at least one of the sub-layers includes a low-temperature film. In some aspects, the passivation layer has a thickness within the range of about 5 nanometers to about 500 nanometers. The passivation layer may have a substantially flat surface, or may be patterned to include channels and/or features such as reaction recesses. The passivation layer may be formed, for example, by chemical vapor deposition (CVD) processes such as plasma-enhanced CVD (PECVD) or low pressure CVD (LPCVD). In one example, reaction recesses 106 are formed in the passivation layer. The reaction recesses 106 on the substrate may be fabricated using, for example, semiconductor manufacturing technology, such that the reaction recesses may be patterned and etched into the passivation layer or other substrate over the sensor surface. The reaction recesses may define reaction areas containing reaction sites for conducting desired reactions.

FIG. 3 is a cross-sectional view of one example of forming wire bonds to electrically connect the sensors to the substrate. Wire bonds 140 connect the sensor bond pads 126 to the topside substrate bond pads 145 which are electrically connected to bottom substrate bond pads 155 through a single via 150 as shown in FIG. 3, or alternatively, through several vias that extend through multiple metallic layers of substrate 130. The wire bonds may be composed of one or more metals, such as aluminum, copper, silver, gold, or any combination thereof. The metals in the wire bonds may be in elemental form, alloy form, or a composite form. For example, the wire bonding may comprise, for example, forming a eutectic metal bond.

Figure 4A:
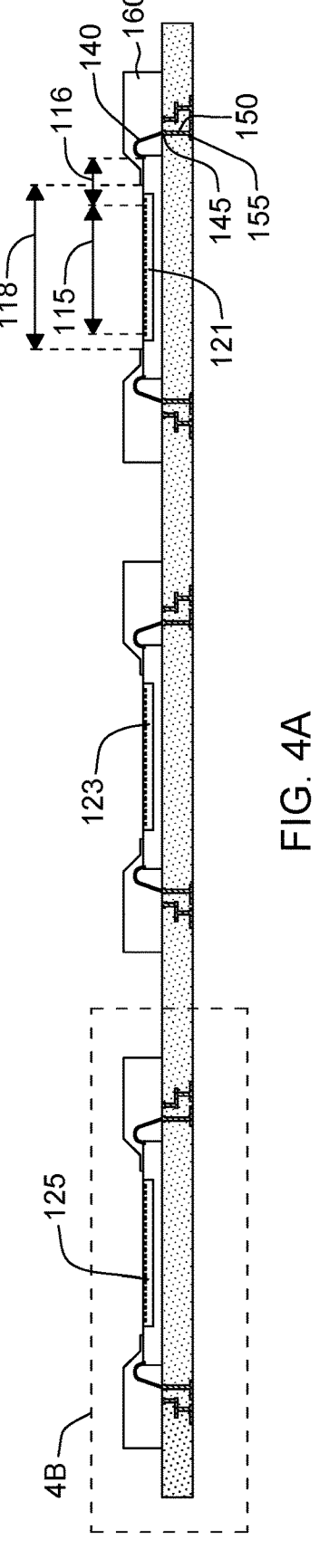
FIG. 4A is a cross-sectional view of one example of forming a molding layer over the substrate of FIG. 3, in accordance with one or more aspects of the present disclosure.
Figure 4B:
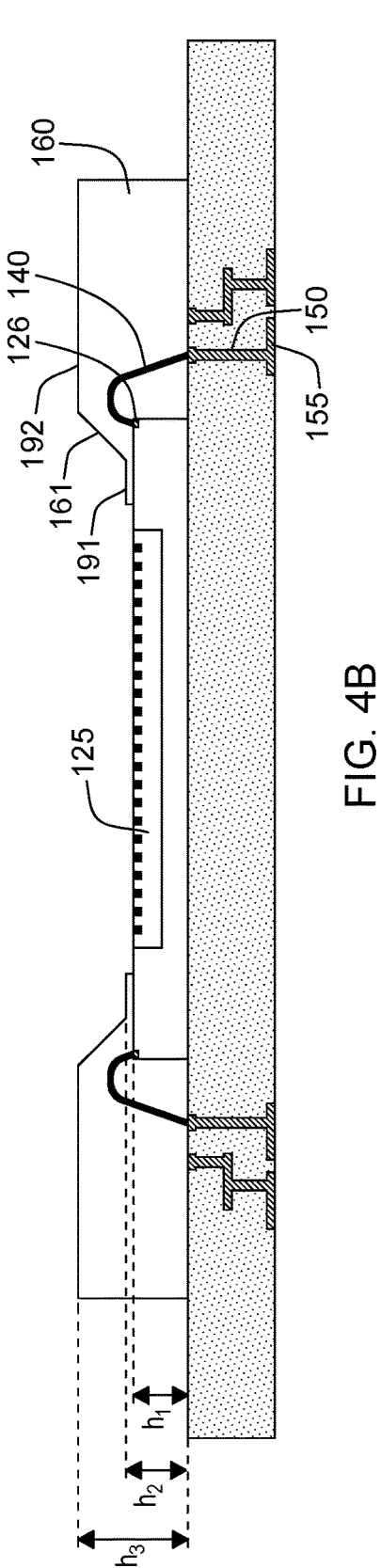
FIG. 4B is an enlarged cross-sectional view of a portion of FIG. 4A.

FIG. 4A is a cross-sectional view of one example of a molding layer 160 formed over the substrate 130. FIG. 4B is an enlarged cross-sectional view of section 4B in FIG. 4A showing sensor 125. In one example, the molding layer is formed directly on the substrate, while in another example an intermediate structure (e.g., a coating or layer) may be interposed between the molding layer and the substrate. The molding layer 160 covers the surface of the substrate 130, including the substrate bond pads 145. The molding layer also covers the sides of sensor 121, wire bonds 140, and the sensor bond pad 126. Depending on the geometry of the sensor, the molding layer may cover the different sides of the sensor at different extents or at the same extent. Molding layer 160 has openings or apertures 118 corresponding to the active surfaces of the sensors, e.g. active surface 115 of sensor 121. In the example of FIG. 4A, the apertures 118 encompass the active surface 115 as well as a portion of the inactive surface 116. In another example, the apertures 118 do not encompass (i.e. do not expose) a portion of the inactive surface 116. The molding layer 160 may include a lower portion 191 and an upper portion 192, with an angled overhang 161. The lower portion 191 may be over the sensor surface. In some examples, the upper portion 192 may not be over the sensor surface. In other examples, some of the upper portion 192 may be over the sensor surface. The angled overhang 161 may be at least partially over the sensor surface, and may be angled (e.g., at 45 degrees or more) to enable more convenient release of the mold from the sensors during fabrication. In this example, the thickness of the molding overhang 161 increases moving from the sensor bond pad to the periphery or outer edge of the sensor. The molding layer 160 is configured to have a top surface of a lower portion 191 that is sufficiently planar or flat to enable a lidding layer to be placed on top of the molding layer 160 (as shown in FIG. 5). The upper portion may also he flat. The molding layer 160 is formed to a height relative to a top surface of the substrate 130 (i.e., "molding height") that is greater than the height of the active surface 115 of the sensor 121 relative to the top surface of the substrate 130 (i.e., "active surface height"). Referring to FIG. 4B, the molding height of the upper portion is represented by "$h_3$", the molding height of the lower portion is represented by "$h_2$" and the active surface height is represented by "$h_1$." In one example, the molding height of the upper portion is about 40 micrometers to about 200 micrometers greater than the active surface height. In one example, the molding height of the upper portion is about 75 micrometers greater than the active surface height. In another example, the molding height of the upper portion is about 100 micrometers greater than the active surface height. In one example, the molding height of the lower portion is about 25 micrometers to about 100 micrometers greater than the active surface height. In one example, the molding height of the lower portion is about 50 micrometers greater than the active surface height. Thus, the thickness of the lower portion of the molding layer is controlled to adjust the height of a lidding layer over the sensor surface 115 as described below in connection with FIG. 5. In one example, the molding height of the upper portion is greater than the height of the top surface of the lidding layer relative to the top surface of the substrate. In other examples, the thickness of the lidding layer and molding height of the upper portion may be such that the molding height of the upper portion is less than the height of the top surface of the lidding layer relative to the top surface of the substrate; however, in such examples, the molding height of the upper portion would be greater than the height of the bottom or lower surface of the lidding layer relative to the top surface of the substrate.

As shown in FIG. 4B, the molding height of the upper portion is greater than the molding height of the lower portion. The lidding layer is placed on top of and secured to the lower portion of the lidding layer, which at least in part defines the gap height or height of the flow channel between the sensor surface and lidding layer. The wire bonds 140 that connect the sensor bond pads 126 to the topside substrate bond pads 145 may have a maximum height relative to a top surface of the substrate that is greater that the molding height of the lower portion. The molding height of the upper portion 192 is greater than the maximum height of the wire bonds 140 relative to a top surface of the substrate. Likewise, a portion of the angled overhang 161 may extend above the height of the wire bonds, while another portion of the angled overhang 161 may extend below the height of the wire bonds. In other examples, the molding layer does not have an angled overhang 161, in which case the lower portion of the molding layer abuts or is adjacent to the upper portion of the molding layer. The examples provide for a reduced gap height of the flow channel between the lidding layer and active sensor surface, while also allowing for the molding layer to cover or enclose wire bonds whose height relative to the top surface of the substrate exceeds the height of the lower surface of the lidding layer relative to the top surface of the substrate.

Non-limiting examples of the material of the molding layer 160 include, for example, an epoxy or a plastic molding compound (e.g.., phenolic hardeners, silicas, catalysts, pigments and mold release agents). During the formation of the molding layer, the sensor surface may be protected with, for example, a protective layer (e.g., a mechanical fixture such as a molding pin) that is removed after the molding layer is deposited to provide an aperture above the active surface (e.g. aperture 118 of FIG. 4A). Alternatively, the molding layer may be conformally deposited, then planarized down to the sensor(s). In one example of conformal deposition and planarization, the molding layer may be blanketly deposited over the structure, followed by a planarization process (e.g., chemical-mechanical polishing (CMP)) to a desired thickness above the sensor surface, for both the lower portion and upper portion. Also, although the molding layer is described as a single layer in this example, it will be understood that the molding layer may be comprised of multiple layers. For example, molding layer 160 could be formed in multiple steps with multiple materials.

Figure 5A:
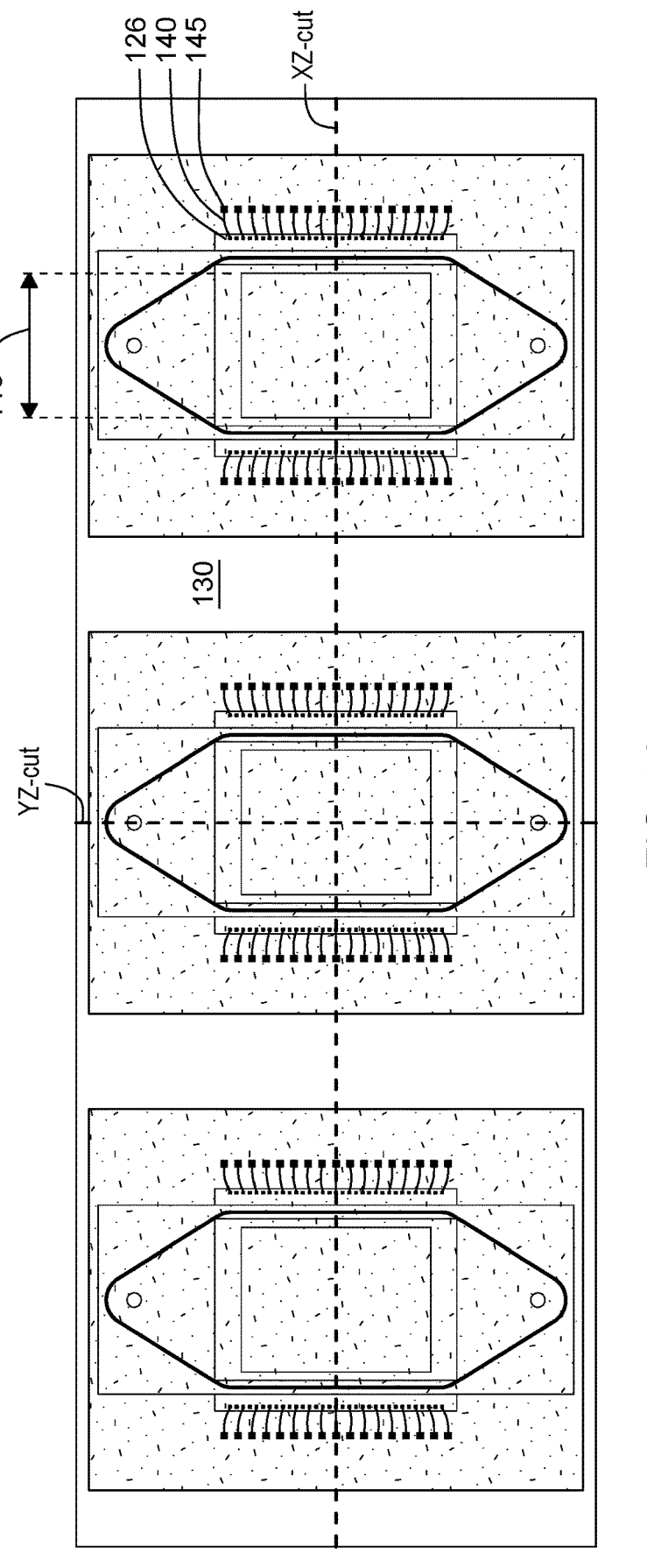
FIG. 5A is a top view of the structure of FIG. 4A, in accordance with one or more aspects of the present disclosure.
Figures 5B, 5C:
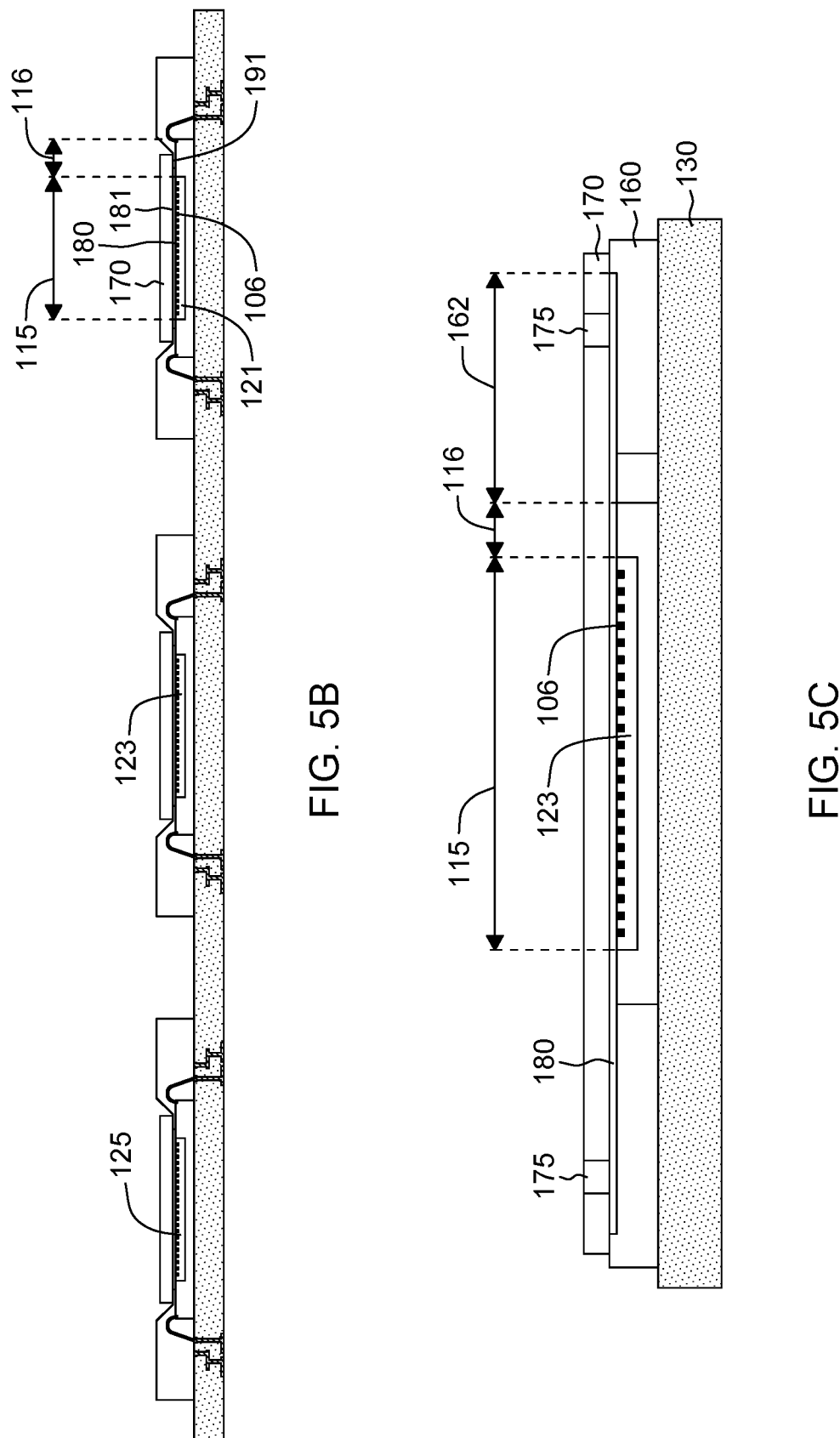
FIG. 5B is a cross-sectional view through dashed line "X" of FIG. 5A following lidding layer attachment, illustrating a fan-out structure in accordance with one or more aspects of the present disclosure.
FIG. 5C is a cross-sectional view through dashed line "Y" of FIG. 5A following lidding layer attachment, in accordance with one or more aspects of the present disclosure.

FIG. 5A is an example of a top view of the structure of FIG. 4, depicting sensors 121, 123, and 125 over substrate 130. Sensor 121 includes active surface 115, sensor bond pads 126, bond wires 140, and substrate bond pads 145, as described above in connection with FIGS. 2-4. FIG. 5B is a cross-sectional view through dashed line "X" of FIG. 5A after placement of a lidding layer 170 over molding layer 160, in accordance with one or more aspects of the present disclosure, to form a flow cell. In one example, lidding layer 170 is in direct contact with the molding layer 160, more specifically, the lower portion 191 of the molding layer. In another example, lidding layer 170 and molding layer 160 are not in direct contact and are separated by an intermediate layer (e.g. spacer or interposer layer), coating or film, with the lidding layer 170 over the lower portion 191, but not the overhang 161 or upper portion 192. The placement of the lidding layer 170 may be accomplished using, for example, relatively precise robotic machines (also known as pick-and-place machines), resulting in a space 181 over the active surface 115 of the sensor 121. In one example, the placement of the lidding layer 170 over the molding layer 160 and over the sensor surface form a space 181 over the active surface of the sensor that defines a flow channel.

As such, the lower portion 191 of the molding layer 160 serves as a spacer between the lidding layer 170 and the sensor surface. In one example, the space 181 over the active surface defines a flow channel 180 of a flow cell. In the example shown in FIG. 5B, the flow channel 180 encompasses the entire active surface 115 of sensor 121 as well as a portion of the inactive surface 116 of sensor 121. As used herein, the flow channel is said to "encompass" surfaces that form the space 181 that defines the flow channel. For example, referring to FIG. 5B, the flow channel 180 encompasses active surface 115 and a portion of inactive surface 116. Similarly, flow channel 180 encompasses the portions of the molding layer 160 and the lidding layer 170 that form space 181. In one example, the flow channel 180 encompasses substantially all of the active surface 115 of the sensor 121. In another example, the flow channel 180 encompasses more than about half of the active surface 115 of the sensor 121.

FIG. 5C is a cross-sectional view through dashed line "Y" through sensor 123 of FIG. 5A after placement of a lidding layer 170 over molding layer 160, in accordance with one or more aspects of the present disclosure, to form a flow cell. Lidding layer 170 includes inlet and outlet ports 175 that provide for inflow and outflow of fluids into the flow channel 180. Each of the inlet and outlet ports can serve as either an inlet or an outlet, depending on the direction of the flow. With reference to FIG. 5C, either of the ports 175 can serve as the inlet port or the outlet port. As shown in the view of FIG. 5C, the flow channel encompasses the entire active surface 115 of sensor 123, the entire inactive surface 116 of sensor 123, as well as portions of the molding layer 160. The horizontal portions of the molding layer 160 encompassed by the flow channel 180, i.e. molding layer surface 162, provides a distance between the inlet/outlet ports 175 and the active surface of the sensor. Thus, molding layer surface 162 is between the inlet/outlet ports 175 and the active surface of the sensor. As such, fluid flowing into the fluid channel 180 from a port 175 is able to reach a more uniform flow before reaching the sensor surface of the sensor, which is desirable for the detection of designated reactions and more efficient utilization of the active sensor surface. In one example, the flow channel 180 encompasses substantially all of the active surface 115 of the sensor 123. In another example, the flow channel 180 encompasses more than about half of the active surface 115 of the sensor 123.

The formation of the molding layer in the areas outside the active surface of the sensor 115, rather than on the active surface of the sensor may be referred to as a fan-out packaging process. The fan-out packaging process described herein provides for greater utilization of the active sensor surface by, for example, providing electrical pathways and lidding methods that improve utilization of the active sensor surface. The lidding layer may include materials that are unreactive with and transparent to incoming light or other waves that may trigger a sensing action from a sensor. It is desired for the lidding layer material to have low autofluorescence or be non-fluorescent to facilitate, for example, the detection of a fluorescent reaction in the flow cell. The material of the lidding layer 170 may be a low autofluorescence plastic or glass. In one example, the lidding layer may be an aluminosilicate glass. In another example, the lidding layer may be a borosilicate glass (e.g., alkaline earth born-aluminosilicate glass, such as Eagle XG® glass by Corning, USA). In another example, the lidding layer may be a floated borosilicate glass (e.g., Borofloat® 33 glass by Schott AG, Germany). The thickness of lidding layer can be, for example, from about 300 μm to about 1000 μm. Substance (s), for example, biological or chemical substances(s), may be introduced into the flow channel 180 for sensing by the active surface of the sensor.

In one example, the active surface of the sensor has a relatively uniform low roughness, i.e., the active surface is as smooth as allowed by suitable fabrication process. In another example, multiple channels for liquid(s) may be present in a secondary layer over the sensor in the space. The optional secondary layer may include, for example, glass as described above, on the sensor surface. Such a secondary layer may have a roughness substantially equal to that of the active surface of the sensor and a seamless interface with the active surface to enable fluidic exchange with reduced, and in some instances, minimum, or even no, entrainment or entrapment of the fluid(s).

Figure 6:
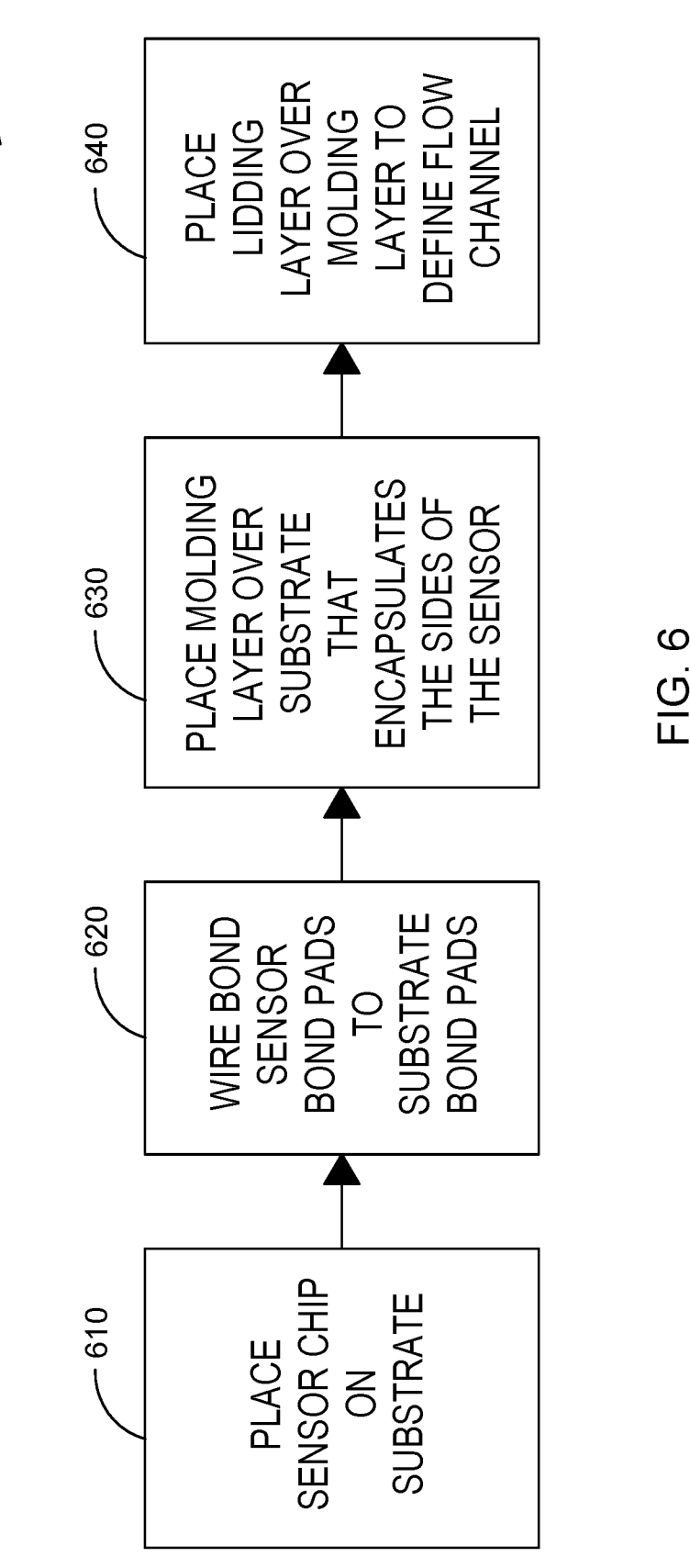
FIG. 6 is a flow diagram of one example of fabricating the apparatus disclosed in FIG. 5B, in accordance with one or more aspects of the present disclosure.

One example of a process 600 for fabricating the apparatus of FIG. 5B in accordance with the present disclosure will now be described with respect to the flow diagram of FIG. 6. In one example, sensors are fabricated on a wafer as described above with respect to FIG. 1. While that example relates to a CMOS detection device, other types of active-pixel sensors may be used. For example, charge-coupled devices (CCDs) and other technologies, such as, for example, NMOS image sensor technology (also known as live MOS sensors) and image sensors with various color filters, microcolor splitters, which differ from the Bayer Color Filter Array (an array of tiny microfilters) in that they diffract light so that various combinations of wave lengths (colors) hit different photosites. A Live MOS Sensor offers image quality comparable to a Full Frame Transfer (FFT) CCD sensor with the low power needs of a CMOS detection device, and in some examples can have high-quality imaging capabilities over an extended period of time. Simplified circuitry that reduces the distance from each photodiode to its corresponding microlens (making for a denser, higher resolution sensor) may facilitate excellent sensitivity and image quality even when light strikes it at a high angle of incidence. In one example, sensor fabrication can include the formation of a passivation layer (as described above in connection with FIG. 2) on the sensor surface to protect the sensor from harmful reaction components and serve as a support surface for wafer level chemistries.

Wafer level chemistry may be applied to all or a portion of the sensor surface (i.e., a "functionalized coating") to facilitate immobilizing biomolecules (or biological or chemical substances) thereto. The functionalized coating may include a plurality of functionalized molecules, which in some aspects, include polymer coatings covalently attached to the surface of a passivation layer over the substrate. The polymer coatings, such as poly(N-(5-azido-acetamidylpentyl)acrylamide-co-acrylamide) (PAZAM), are used in the formation and manipulation of substrates, such as molecular arrays and flow cells. The passivation layer may be coated, in at least one area, by using beads coated with a covalently attached polymer, such as PAZAM, and used in determining a nucleotide sequence of a polynucle-otide attached to a substrate surface, in some aspects. In some examples, nucleic acids can be immobilized to the functionalized sensor surface, such as to surfaces of reaction recesses (e.g., nanowells). Natural nucleotides and enzymes that are configured to interact with the natural nucleotides maybe utilized. Natural nucleotides include, for example, ribonucleotides or deoxyribonucleotides. Natural nucleo-tides can be in the mono-, di-, or tri-phosphate form and can have a base selected from adenine (A), Thymine (T), uracil (U), guanine (G) or cytosine (C). It will be understood, however, that non-natural nucleotides, modified nucleotides or analogs of the aforementioned nucleotides can be utilized.

At 610 one or more sensors are placed over a substrate. By way of example, the sensors may be provided from a diced and simulated sensor wafer. The placement of the sensor over the substrate may include preparation, which may involve, for example, lithographic and plating processes, and placement may be accomplished using, for example, precise robotic machines (also known as pick-and-place machines). In one example, this panelization may then be performed to join the sensor and the supporting layer. Panelization may include, for example, carrier lamination, attaching be sensor to a die, positioning the die on the supporting layer and fixing with a molding compound, planarization (or "top grind") of the molding compound and backside film lamination.

Next, at 620, sensor bond pads (e.g., sensor bond pads 126 of FIG. 4A) are wire bonded to substrate bond pads (e.g., substrate bond pads 145 of FIG. 4A). At 630, a molding layer is formed over the substrate but not over the active sensor surface. The molding layer formation may include covering/protecting the sensor surface(s) with, for example, a protective layer (e.g., a mechanical fixture such as a molding pin) that is removed after the molding layer is deposited. The molding layer formation also includes form-ing a lower portion and an upper portion. In some examples, an angled overhang is also formed during the molding layer formation. By way of example, the molding layer may be deposited in a liquid or solid form and formed using com-pression molding.

At 630, a lidding layer is placed over the lower portion of the molding layer and over the sensor surface to define a flow channel. The placement of the lidding layer may be done using, for example, a surface mount process. In this example, lidding is performed at the wafer level, but in another example lidding can be done after dicing. In the surface mount process, the lidding layer is positioned over the molding layer using, for example, the precise robotic machines described above, and attached in some manner (e.g., using epoxy). Such machines may be used to place surface-mount devices onto a printed circuit board or similar structure. Such machines may use, for example, pneumatic suction cups manipulated in three dimensions to effect placement of the lidding layer. The molding layer may be in direct contact with the lidding layer, or alternatively, may be separated by a coating, film, or other material layer. The composition of the lidding layer can be as described above in connection with FIG. 4. By way of example, the lidding layer may be a glass wafer that is bonded to the molding layer. Following process 600, for example, the substrate can be diced into individual dies each containing one or more flow cell sensors.

In one aspect, an apparatus is provided, for example a sensor apparatus. The apparatus comprises a substrate hav-ing a substrate bond pad; a sensor over the substrate, the sensor comprising an active surface and a sensor bond pad; a molding layer over the substrate and covering sides of the sensor, the molding layer having a lower portion with a first molding height relative to a top surface of the substrate and an upper portion with a second molding height relative to the top surface of the substrate, the first molding height and the second molding height each being greater than a height of the active surface, the second molding height being great than the first molding height; and a lidding layer over at least some of the lower portion of the molding layer and over the active surface; wherein the lidding layer and the molding layer collectively form a space over the active surface of the sensor, the space defining a flow channel.

In some examples, the apparatus further comprises a wire bond connecting the sensor bond pad to the substrate bond pad.

In some examples, the upper portion of the molding layer covers the wire bond.

In some examples, the second molding height of the upper portion is greater than a height of a top surface of the lidding layer relative to the top surface of the substrate.

In some examples, the apparatus further comprises a passivation layer over the active surface of the sensor.

In some examples, the passivation layer comprises reac-tion recesses.

In some examples, the apparatus further comprises a functionalized coating over the passivation layer.

In some examples, the flow channel encompasses sub-stantially all of the active surface of the sensor.

In some examples, the flow channel encompasses the entire active surface of the sensor and at least a portion of an inactive surface of the sensor.

In some examples, the lower portion is flat.

In some examples, the upper portion is flat.

In some examples, the lidding layer comprises an inlet port and an outlet port.

In some examples, a surface of the molding layer is between the inlet port and the active surface of the sensor within the flow channel.

In some examples, the substrate comprises one or more dielectric layers, each of the one or more dielectric layers comprising one or more conductive pathways therein.

In some examples, the sensor comprises a Complemen-tary Metal-Oxide-Semiconductor (CMOS) detection device.

In some examples, the apparatus is part of a cartridge to perform biological analysis, chemical analysis, or both.

In accordance with another aspect, a method is provided. The method comprises placing a sensor over a substrate, the sensor comprising an active surface and a sensor bond pad, wherein the substrate comprises a substrate bond pad; form-ing a molding layer over the substrate that covers the sides of the sensor, the molding layer having a lower portion with a first molding height relative to a top surface of the substrate and an upper portion with a second molding height relative to the top surface of the substrate, the first molding height and the second molding height each being greater than a height of the active surface, the second molding height being great than the first molding height; and placing a lidding layer over at least some of the lower portion of the molding layer and over the sensor surface to form a space over the active surface of the sensor, wherein the space defines a flow channel.

In some examples, the method further comprises wire bonding the sensor bond pad to the substrate bond pad.

In some examples, the method further comprises covering the wire bonds with the upper portion of the molding layer.

In some examples, the method further comprises forming an inlet port and an outlet port in the lidding layer.

In some examples, the method further comprises comprising forming a passivation layer on the sensor surface.

In some examples, the method further comprises forming reaction recesses in the passivation layer.

In some examples, the method further comprises comprising forming a functionalized coating on the passivation layer.

In accordance with another aspect, a method of using a flow cell is provided. The method comprises: connecting the flow cell to a device, the flow cell comprising: a substrate having a substrate bond pad; a sensor over the substrate, the sensor comprising an active surface and a sensor bond pad; a molding layer over the substrate and covering sides of the sensor, the molding layer having a lower portion with a first molding height relative to a top surface of the substrate and an upper portion with a second molding height relative to the top surface of the substrate, the first molding height and the second molding height each being greater than a height of the active surface, the second molding height being great than the first molding height; and a lidding layer over at least some of the lower portion of the molding layer and over the active surface, wherein the lidding layer and the molding layer collectively form a space over the active surface of the sensor, the space defining a flow channel; utilizing the active surface to perform a designated reaction in the flow cell, the utilizing comprising: delivering, via the flow channel, at least one reaction component to the active surface; and transmitting results of the designated reaction to the device.

In accordance with another aspect, a method of using a flow cell is provided. The method comprises: delivering, via a flow channel of the flow cell, at least one reaction component to an active surface of the flow cell, the flow cell comprising: a substrate having a substrate bond pad; a sensor over the substrate, the sensor comprising the active surface and a sensor bond pad; a molding layer over the substrate and covering sides of the sensor, the molding layer having a lower portion with a first molding height relative to a top surface of the substrate and an upper portion with a second molding height relative to the top surface of the substrate, the first molding height and the second molding height each being greater than a height of the active surface, the second molding height being great than the first molding height; and a lidding layer over at least some of the lower portion of the molding layer and over the active surface, wherein the lidding layer and the molding layer collectively form a space over the active surface of the sensor, the space defining the flow channel; and detecting a designated reaction using the active surface.

It is to be understood that the above description is intended to be illustrative, and not restrictive. For example, the above-described examples (and/or aspects thereof) may be used in combination with each other. In addition, many modifications may be made to adapt a particular situation or material to the teachings of the various examples without departing from their scope. While dimensions and types of materials may be described herein, they are intended to define parameters of some of the various examples, and they are by no means limiting to all examples and are merely exemplary. Many other examples will be apparent to those of skill in the art upon reviewing the above description. The scope of the various examples should, therefore, be determined with reference to the appended claims, along with the full scope of equivalents to which such claims are entitled.

In the appended claims, the terms "first," "second," and "third," etc. are used merely as referee labels, and are not intended to impose numerical, structural or other requirements on their objects. Forms of the term "defined" encompass relationships where an element is partially defined as well as relationships where an element is entirely defined. Further, it is to be understood that not necessarily all such objects or advantages described above may be achieved in accordance with any particular example. Thus, for example, those skilled in the art will recognize that the devices, systems and methods described herein may be embodied or carried out in a manner that achieves or optimizes one advantage or group of advantages as taught herein without necessarily achieving other objects or advantages as may be taught or suggested herein.

While the disclosure has been described in detail in connection with only a limited number of examples, it should be readily understood that the disclosure is not limited to such disclosed examples. Rather, this disclosure can be modified to incorporate any number of variations, alterations, substitutions or equivalent arrangements not heretofore described, but which are commensurate with the spirit and scope of the disclosure. Additionally, while various examples have been described, it is to be understood that aspects of the disclosure may include only one example or some of the described examples. Also, while some disclosures are described as having a certain number of elements, it will be understood that the examples can be practiced with less than or greater than the certain number of elements.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

The invention claimed is:

1. An apparatus, comprising:

a substrate having one or more substrate bond pads;

a sensor over the substrate, the sensor comprising an active surface disposed between at least two sensor bond pads;

wire bonds wherein each wire bond is configured to couple a sensor bond pad of the at least two sensor bond pads to a substrate bond pad of the one or more substrate bond pads;

a molding layer disposed over the substrate and covering at least one side of the sensor and the wire bonds, the molding layer having a lower portion with a first molding height relative to a top surface of the substrate and an upper portion with a second molding height relative to the top surface of the substrate, the first molding height and the second molding height each being greater than a height of the active surface, the second molding height being great than the first molding height; and a lidding layer disposed over at least some of the lower portion of the molding layer and the active surface;

wherein the lidding layer and the molding layer are configured to collectively form a space disposed above the active surface of the sensor, the space configured to define a flow channel.

2. The apparatus of claim 1, wherein the second molding height of the upper portion is greater than a height of a top surface of the lidding layer relative to the top surface of the substrate.

3. The apparatus of claim 1, further comprising a passivation layer over the active surface of the sensor.

4. The apparatus of claim 3, wherein the passivation layer comprises reaction recesses.

5. The apparatus of claim 3, further comprising a functionalized coating over the passivation layer.

6. The apparatus of claim 1, wherein the flow channel encompasses substantially all of the active surface of the sensor.

7. The apparatus of claim 1, wherein the flow channel encompasses an entirety of the active surface of the sensor and at least a portion of an inactive surface of the sensor.

8. The apparatus of claim 1, wherein one or more of the lower portion and the upper portion is flat.

9. The apparatus of claim 1, wherein the lidding layer comprises an inlet port and an outlet port, and wherein a surface of the molding layer is between the inlet port and the active surface of the sensor within the flow channel.

10. The apparatus of claim 1, wherein the substrate comprises one or more dielectric layers, each of the one or more dielectric layers comprising one or more conductive pathways therein.

11. The apparatus of claim 1, wherein the apparatus is part of a cartridge to perform biological analysis, chemical analysis, or both.

12. A method, comprising:

placing a sensor over a substrate, the sensor comprising an active surface disposed between at least two sensor bond pads, wherein the substrate comprises one or more substrate bond pads;

forming wire bonds by utilizing wires to bond each sensor bond pad of the at least two sensor bond pads to a substrate bond pad of the one or more substrate bond pads;

forming a molding layer over the substrate that covers at least one side of the sensor and the wire bonds, the molding layer having a lower portion with a first molding height relative to a top surface of the substrate and an upper portion with a second molding height relative to the top surface of the substrate, the first molding height and the second molding height each being greater than a height of the active surface, the second molding height being great than the first molding height; and placing a lidding layer over at least some of the lower portion of the molding layer and over the sensor surface to form a space over the active surface of the sensor, wherein the space defines a flow channel.

13. The method of claim 12, wherein the upper portion of the molding layer covers the wire bonds in the forming.

14. The method of claim 12, further comprising forming an inlet port and an outlet port in the lidding layer.

15. The method of claims 12, further comprising forming a passivation layer on the sensor surface.

16. The method of claim 15, further comprising:

forming reaction recesses in the passivation layer; and forming a functionalized coating on the passivation layer.

17. A method of using a flow cell, comprising:

connecting the flow cell to a device, the flow cell comprising:

a substrate having one or more substrate bond pads;

a sensor over the substrate, the sensor comprising an active surface disposed between at least two sensor bond pads;

wire bonds wherein each wire bond is configured to couple a sensor bond pad of the at least two sensor bond pads to a substrate bond pad of the one or more substrate bond pads;

a molding layer disposed over the substrate and covering at least one side of the sensor and the wire bonds, the molding layer having a lower portion with a first molding height relative to a top surface of the substrate and an upper portion with a second molding height relative to the top surface of the substrate, the first molding height and the second molding height each being greater than a height of the active surface, the second molding height being great than the first molding height; and a lidding layer disposed over at least some of the lower portion of the molding layer and the active surface;

wherein the lidding layer and the molding layer are configured to collectively form a space disposed above the active surface of the sensor, the space configured to define a flow channel;

utilizing the active surface to perform a designated reaction in the flow cell, the utilizing comprising:

delivering, via the flow channel, at least one reaction component to the active surface; and transmitting results of the designated reaction to the device.

* * * * *